United States Patent [19]

Coulon et al.

[11] Patent Number: 5,712,760
[45] Date of Patent: Jan. 27, 1998

[54] COMPACT FOLDABLE KEYBOARD

[75] Inventors: Kenneth E. Coulon, Plano; Satwinder D.S. Malhi, Garland, both of Tex.

[73] Assignee: Texas Instruments Incorporated, Dallas, Tex.

[21] Appl. No.: 592,148

[22] Filed: Jan. 26, 1996

[51] Int. Cl.$^6$ .................. G06F 1/16; H05K 5/03
[52] U.S. Cl. .............. 361/680; 361/681; 345/905
[58] Field of Search ............... 361/679, 680, 361/681, 683; 345/168, 169, 905; 400/489, 682, 691, 692, 693; 312/208.1, 208.4; 341/22; 364/708.1; G06F 1/16

[56] References Cited

U.S. PATENT DOCUMENTS

| | | | |
|---|---|---|---|
| D. 362,434 | 9/1995 | Abell, Jr. et al. | D14/115 |
| 3,940,758 | 2/1976 | Margolin | 345/169 |
| 4,839,837 | 6/1989 | Chang | 364/708 |
| 5,187,644 | 2/1993 | Crisan | 361/393 |
| 5,267,127 | 11/1993 | Pollitt | 361/680 |
| 5,276,589 | 1/1994 | Bartlett et al. | 361/681 |
| 5,278,779 | 1/1994 | Conway et al. | 364/708.1 |
| 5,287,245 | 2/1994 | Lucente et al. | 361/680 |
| 5,333,116 | 7/1994 | Hawkins et al. | 364/708.1 |
| 5,400,055 | 3/1995 | Ma et al. | 345/168 |
| 5,432,720 | 7/1995 | Lucente et al. | 364/708.1 |
| 5,436,792 | 7/1995 | Leman et al. | 361/686 |
| 5,457,453 | 10/1995 | Chiu et al. | 341/22 |
| 5,459,461 | 10/1995 | Crowley et al. | 341/22 |
| 5,543,787 | 8/1996 | Karidis et al. | 341/20 |

*Primary Examiner*—Leo P. Picard
*Assistant Examiner*—Lynn D. Feild
*Attorney, Agent, or Firm*—Bret J. Petersen; James C. Kesterson; Richard L. Donaldson

[57] ABSTRACT

A deployable keyboard similar in size to those found in notebooks or subnotebooks of the prior art or a full size keyboard is provide for portable electronic devices, such as personal data assistants (PDAs) allowing greater flexibility and easier input for the user without compromising the PDAs small format. In other embodiments, laptops, notebooks, sub-notebooks and PDAs are provided with full function keyboards which approximate the size of a typical desktop computer keyboard when in use, but when in a non-use configuration they have significantly smaller dimensions. In one embodiment, a portable pen computer 100 is provided which includes a housing 102, and first and second keyboard sections 110, 112 having a plurality of alphanumeric and/or operational keys. Each of the keyboard sections are connected by a first hinge 108 for folding and attached to the housing with a second hinge 116 for permitting selective pivotal rotation for deployment from a storage position in the bottom portion of the housing. The first hinge located between the keyboard sections divides the keyboard lengthwise into a top section and a bottom section. In a deployed position, the first and second keyboard sections are designed to form a substantially full-size keyboard. The planar top surface contains a display screen which can also be used for pen input of data.

19 Claims, 5 Drawing Sheets

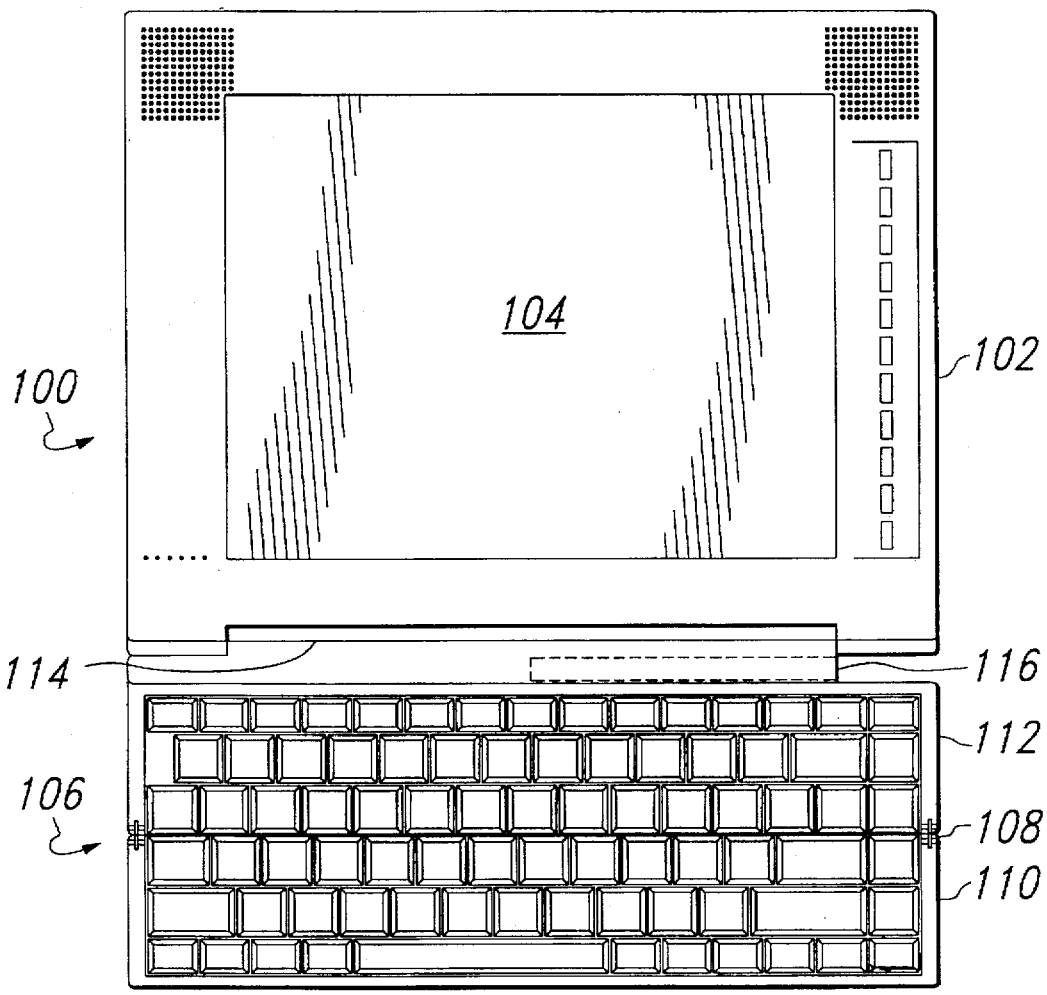
Fig. 1a
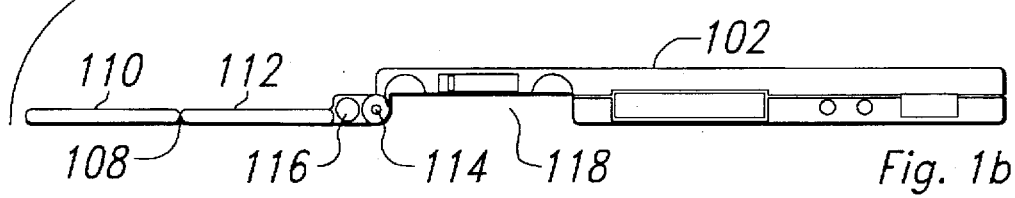
Fig. 1b
Fig. 1C
Fig. 1d
Fig. 1e

COMPACT FOLDABLE KEYBOARD

FIELD OF THE INVENTION

This invention relates to portable electronic devices having monitors and keyboards, and more particularly, to portable personal computers such as notebooks, subnotebooks and pen computers, and means for providing more keyboard space for these types of computers without sacrificing their compactness by incorporating a foldable keyboard.

BACKGROUND OF THE INVENTION

Portable personal computers have developed from early luggable "suit case" designs, through the smaller "laptop" design, and now, with the aid of increasingly smaller packaging to "notebook," "sub-notebook" and personal digital assistants (PDAs) such as pen computers. While early portables were bulky and inefficient, laptops, notebooks and personal digital assistants have considerably improved the state-of-the-art by providing a battery supply, light weight circuitry and computer storage devices in a compact housing that can easily be carried by the user. As development of portable personal computers has advanced, substantially the full function of a more conventional desktop machine has been retained in the larger model such as the notebooks, while the subnotebooks typically lack floppy disk drives and the PDAs also typically lack keyboards due to their small size.

A "notebook" personal computer is about the size of a conventional loose leaf binder holding letter size paper, and typically weighs about 5–8 pounds. PDAs typically are too small to incorporate a keyboard and therefore often use a pen as the main interface for input. PDAs may weigh less than one pound to about 3 pounds with a screen size of about 5 by 7 inches or smaller. Those portable computers having size, weight and performance lying between the notebook and PDA are typically referred to as subnotebooks. In many portable notebook computer models, a keyboard compartment is hinged to a display screen compartment in such a manner that it is possible to fold the display screen compartment down against the keyboard compartment and to latch the two together. PDAs typically are a single enclosure with a screen on the top surface.

A limitation on the reduction in the size of personal computers has been the desire of users for a keyboard at least approximating those known and used with desktop and floor standing machines. Such conventional keyboards typically have an elongated rectangular form with alphanumeric keys arrayed in rows and staggered columns and with special function keys appropriate to the personal computer arrayed around the alphanumeric keys in a standard array. Such keyboards may have varying numbers and arrangements of keys, and several such arrangements have become more or less conventional and known by the number of keys provided. As efforts have been expended toward reducing the physical size of portable personal computers, some designers have chosen to reduce the size of the keys and thus the keyboards, while others have chosen to eliminate or combine certain functions provided in more conventional keyboards. Such efforts have succeeded to the point that notebook portable personal computers have had some success in the marketplace, however users of such computers often have complaints about key size and keyboard arrangement as compared with more conventional keyboards used with desktop machines. Restraints on key size and arrangement have effectively imposed a lower size limitation on keyboard length and width of about the size of a sheet of correspondence stationery. Moreover, because the alphanumeric keys must be of sufficient size to accommodate even large fingers, certain keys are often deleted or rearranged from their "usual" position on the keyboard to retain compactness. These accommodations have made it more difficult for many users to transfer their typing skills to the smaller keyboards, have increased the likelihood of user error, and have sacrificed the available options associated with the missing keys.

SUMMARY OF THE INVENTION

This invention provides portable electronic devices, such as PDAs with the optional capability of a full size keyboard or a smaller keyboard similar to those commonly found in notebooks or subnotebooks. This invention releases the PDA from being limited to pen input, allowing greater flexibility and easier input for the user. In other embodiments, the present invention provides laptops, notebooks and subnotebooks with full function keyboards which approximate the size of a typical desktop computer keyboard when in use, but significantly smaller dimensions when in a non-use configuration. The increased keyboard size permits comfortable typing with layouts familiar to users without sacrificing the light weight and compactness normally associated with smaller portable computers.

In an embodiment of the invention, a portable pen computer is provided which includes a housing having substantially planar top and bottom surfaces. The housing also includes first and second keyboard sections which are connected by a first hinge to allow the sections to be folded together. The keyboard sections are attached to the housing with a second hinge for permitting pivotal rotation for deployment from a storage position in the bottom portion of the housing. The first hinge located between the keyboard sections divides the keyboard lengthwise into a top section and a bottom section, the top section having the function keys, number keys and the top row of alpha keys, and the bottom section having the bottom two rows of alpha keys and the spacebar row of keys. In the storage position, the key surfaces of the keyboard sections are facing one another for protection of the keys when not in use. In a deployed position, the first and second keyboard sections are designed to form a substantially full-size keyboard. The planar top surface contains a display screen which can also be used for pen input of data.

In another embodiment of the present invention, the hinge between the two keyboard sections is located between the left and right hand sections of the keyboard such that the hinge runs vertically from the top center of the keyboard to the bottom. To stow the keyboard, the first keyboard section is folded from right to left, on top of the second keyboard section. The two keyboard sections are then pivoted under the housing with the keys of the two sections facing each other and the back of the first section facing outward and becoming planar with the bottom of the housing.

In an additional embodiment of the present invention, a keyboard is comprised of three sections connected by two hinges, with a third hinge used to fold the keyboard sections into the bottom of the housing. An advantage of the present invention is illustrated in this embodiment which may allow the implementation of a full-size, desk-top like keyboard to be implemented on a PDA or notebook computer.

In another embodiment of the present invention, the hinge between the two keyboard sections is located between the left and right hand sections of the keyboard such that the hinge runs vertically in a straight line from the top center of the keyboard to the bottom. To stow the keyboard, the first keyboard section is folded from left to right, on top of the second keyboard section. The two keyboard sections are then rotated under the housing about a pivot point lying in about the center of the housing, with the keys of the two sections facing each other and the back of the second section facing downward and remaining planar with the bottom of the housing.

An advantage of the present invention is that the keyboards after being folded are rotated or pivoted to a storage position beneath the display housing. This structure allows the overall form factor of the folded device to be limited only by the display size.

Another advantage of the present invention is the keyboard and housing can lie securely on a flat surface where the keyboard to housing hinge is designed so that both the keyboard and the housing bottom surfaces lie in the same plane, allowing the user to type comfortably with the keyboard in a deployed position.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1a Represents a plan view of a preferred embodiment of the present invention having a horizontal hinge;

FIG. 1b Represents a cross-sectional view of the preferred embodiment of FIG. 1a;

FIG. 1c Represents a cross-sectional view of the preferred embodiment of FIG. 1a at 1c—1c;

FIG. 1d Represents a back view of the preferred embodiment of FIG. 1a which shows the peripheral connectors;

FIG. 1e Represents a pen for screen input;

FIG. 2b Represents a plan view of the preferred embodiment of FIG. 2a;

FIG. 3b Represents a side view of the preferred embodiment of FIG. 3a;

FIG. 3c Represents a side view of the preferred embodiment of FIG. 3a.

FIG. 4b Represents a side view of the preferred embodiment of FIG. 4a.

DETAILED DESCRIPTION OF THE PREFERRED EMBODIMENTS

Figure 2A:
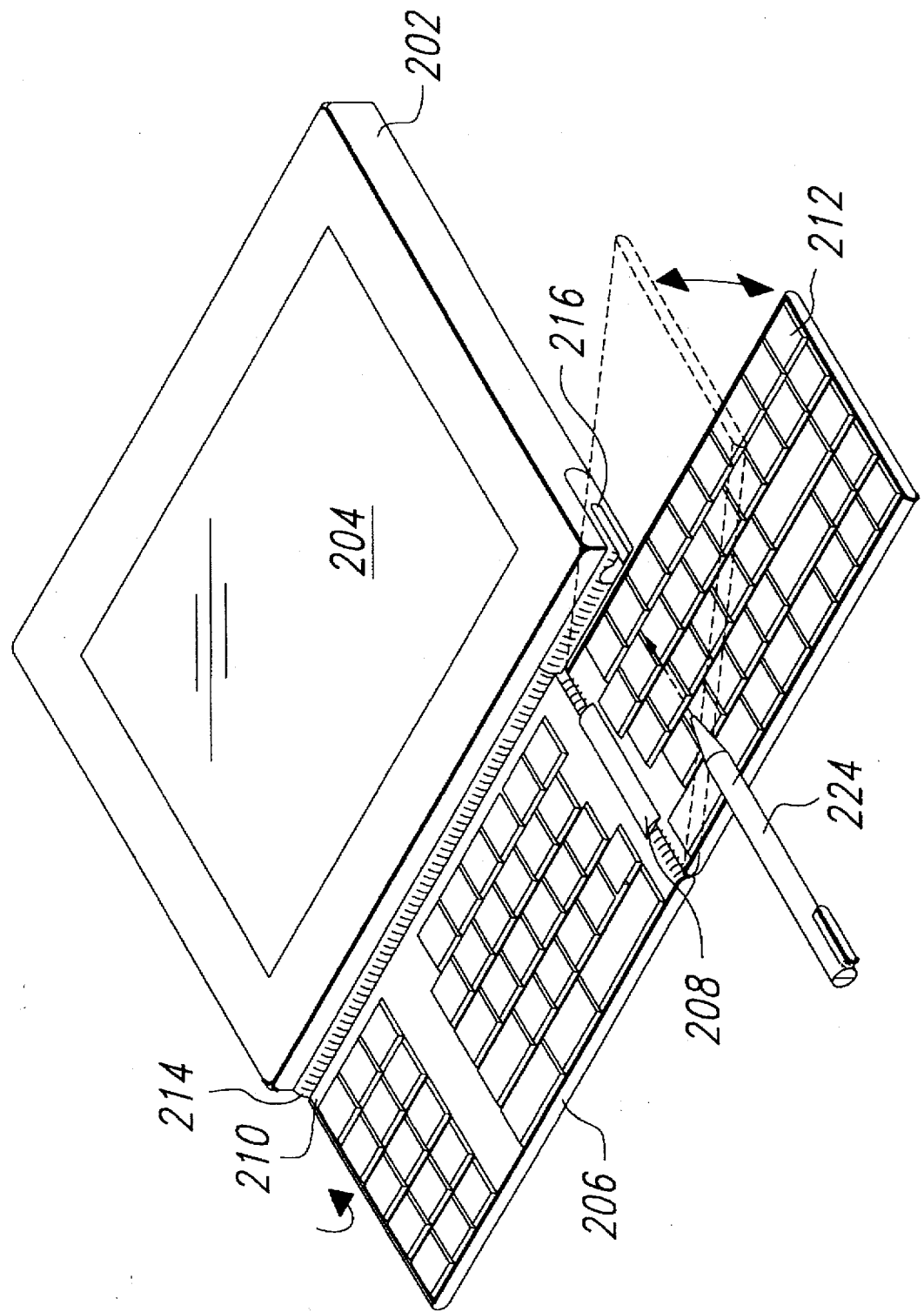
FIG. 2a Represents a perspective view of a preferred embodiment of the present invention having a vertical hinge with a two part keyboard.

The preferred embodiments of the present invention are best understood by referring to FIGS. 1a–4b of the drawings, like numerals being used for like and corresponding parts of the various drawings.

With reference to FIG. 1a, there is shown an embodiment of the present invention in connection with a portable computer 100 of the type commonly referred to as a pen computer or personal digital assistant. Computer 100 includes a housing 102 with a screen 104, and is uniquely provided with a folding keyboard 106 shown in the deployed position in FIG. 1. In this embodiment, the keyboard 106 comprises a first hinge 108 connecting a lower keyboard section 110 with an upper keyboard section 112. The first hinge connects the keyboard sections between a row of keys in the typical keyboard layout and preferably in the center of the keyboard. Thus, in a preferred embodiment there are 3 rows of keys above and three rows of keys below the hinge in the respective sections of the keyboard.

The first section of the keyboard 110 may be electrically connected with a flexible connection through the hinge 108 to the second section 112 or directly to the motherboard located in the housing 102. The sections 110, 112 may incorporate individual circuit boards for interconnecting the keys, or they may use a single flexible circuit board with the interconnections between the sections through the hinge 108.

A second hinge 114, shown in FIG. 1a and FIG. 1b, pivotally connects the two hinged keyboard sections to the housing 102. The hinge structure may be of any suitable hinge appropriate to the usage expected of the computer, such as a piano hinge, a "living" hinge molded of synthetic materials, or other hinges known to persons skilled in the applicable arts of mechanical design. In the illustrated preferred embodiment, the second hinge 114 is integrally formed with the housing 102 and has a lower surface in a plane with the lower surface of the housing. The second hinge 114 is thus preferably formed in such a way as to insure the keyboard and housing will lie securely on a flat surface allowing the user to type comfortably with the keyboard in a deployed position. The second hinge 114 also preferably incorporates electrical connections from the keys to the main processing board of the computer to transmit signals corresponding to the pressing of keys by the user. Also in this preferred embodiment is a pen holder cavity 116 integrally formed with the second hinge 114 as shown in FIG. 1b.

FIG. 1c shows a side view of the preferred embodiment of FIG. 1a with the keyboard 106 in the stowed position. The keyboard is stowed by first folding the keyboard about hinge 108, shown by the arrow in FIG. 1b and then rotating the folded keyboard into the cavity 118 in the underside of the housing, shown by the arrow in FIG. 1c.

A back view of the housing 102 is shown in FIG. 1d. Various connectors 120 are shown for making connections to the computer such as serial communication ports, parallel communication ports, modem, external power, etc. Also shown is an on/off switch 122. FIG. 1e represents a pen 124 that maybe used for imputing on the screen 104 and is stored in pen cavity 116.

Figure 2B:
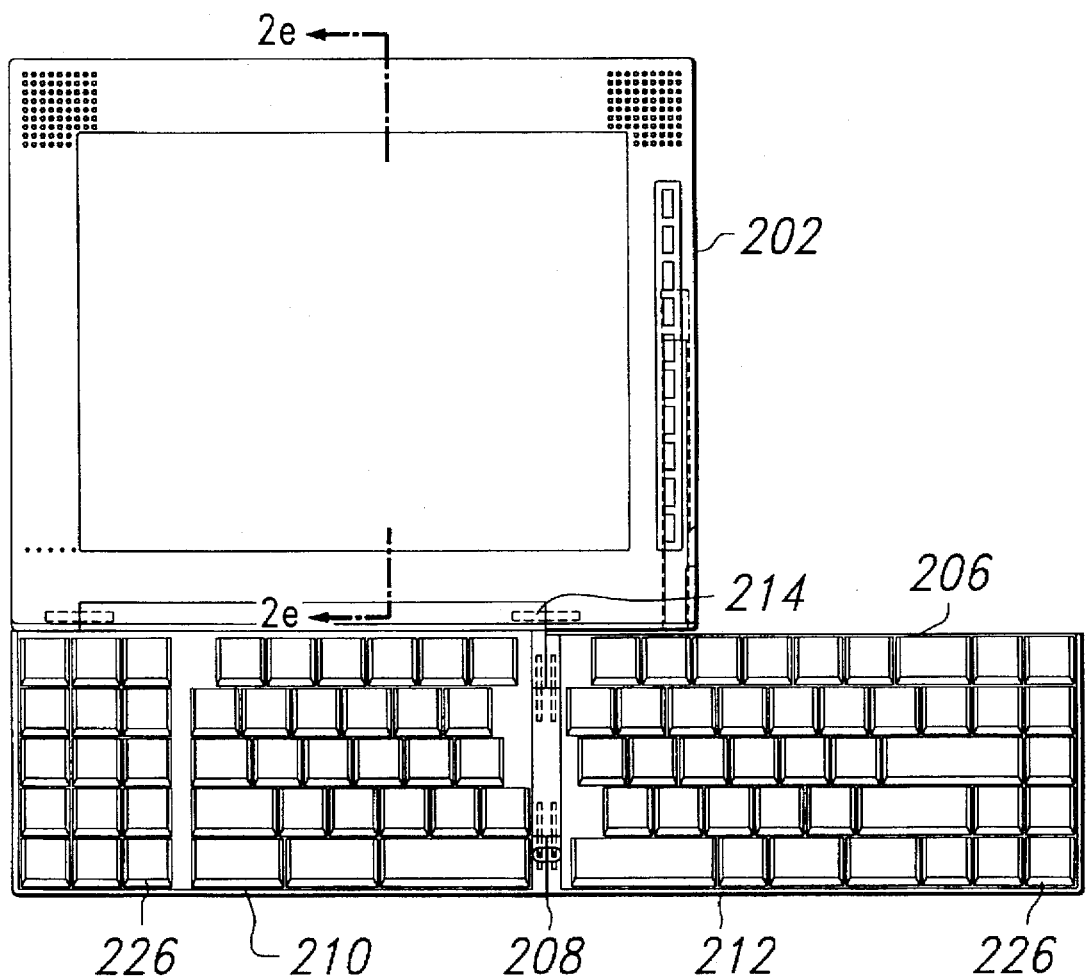

With reference to FIG. 2a there is shown a perspective view, and with reference to FIG. 2b a plan view of a second embodiment of the present invention also shown in connection with a portable computer 200 of the type commonly referred to as a pen computer or personal digital assistant. Computer 200 includes a housing 202 with a screen 204, and is uniquely provided with a folding keyboard 206 shown in the deployed position in FIG. 2a. In this embodiment, the keyboard 206 comprises a first hinge 208 connecting a left side keyboard section 210 with a right side keyboard section 212. The first hinge connects the keyboard sections between a staggered column of keys in the typical keyboard layout as shown in FIG. 2b. The location of the break for the keyboard sections is chosen such that each side of the keyboard has the keys associated with either the right or left hand according to the typing strokes of a touch typist, preferably using the industry standard QUERTY keyboard. The keyboard may also contain function keys 226 in one or both of the keyboard sections as indicated in FIG. 2b. In the preferred embodiment, the housing containing the sections of the keyboard have a straight edge at the hinge with the keys associated with the QUERTY on either section. Therefore, although the keys of the left and right section have a jagged break point, the housing has a simple straight edge. This gives a simpler housing structure over prior art U.S. Pat. No. 5,457,453 to Chiu et al, incorporated herein by reference.

The first section of the keyboard 210 may be electrically connected with a flexible connection through the hinge 108 to the second section 212 or directly to the motherboard located in the housing 202. The sections 210, 212 may incorporate individual circuit boards for interconnecting the keys, or they may use a single flexible circuit board with the interconnections between the sections through the hinge 208.

A second hinge 214, shown in FIG. 2a and FIG. 2b, pivotally connects the two hinged keyboard sections to the housing 202. In the illustrated preferred embodiment, the second hinge 214 is integrally formed with the housing 202 and has a lower surface in a plane with the lower surface of the housing in such a way as to insure the keyboard and housing will lie securely on a flat surface allowing the user to type comfortably with the keyboard in a deployed position. The second hinge 214 also preferably incorporates electrical connections from the keys to the main processing board of the computer to transmit signals corresponding to the pressing of keys by the user. Also in this preferred embodiment is a pen holder cavity 216 integrally formed with the housing 202 to hold pen 224 as shown in FIG. 2a.

Figure 2C:
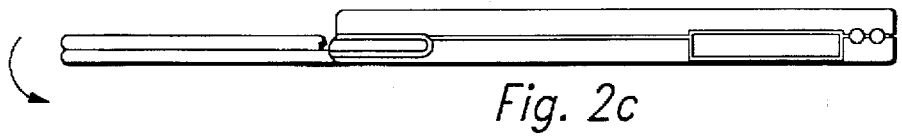
FIG. 2c Represents a right side view of the preferred embodiment of FIG. 2a with the keyboard deployed.
Figure 2D:
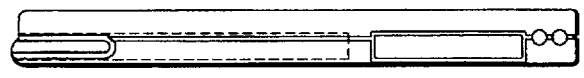
FIG. 2d Represents a right side view of the preferred embodiment of FIG. 2a with the keyboard stowed.
Figure 2E:
FIG. 2e Represents a cross-sectional view of the housing of the preferred embodiment shown in FIG. 2b at 2e—2e.

FIG. 2c shows a side view of the preferred embodiment of FIG. 2a with the keyboard 206 in the deployed position, while FIG. 2d shows a side view of the preferred embodiment of FIG. 2a with the keyboard 206 in the stowed position. The keyboard is stowed by first folding the keyboard about hinge 208, shown by the arrow in FIG. 2a and then rotating the folded keyboard into the cavity 218 in the underside of the housing, shown by the arrow in FIG. 2c. FIG. 2e represents a sectional view as indicated in FIG. 2b at 2e—2e.

Figure 3A:
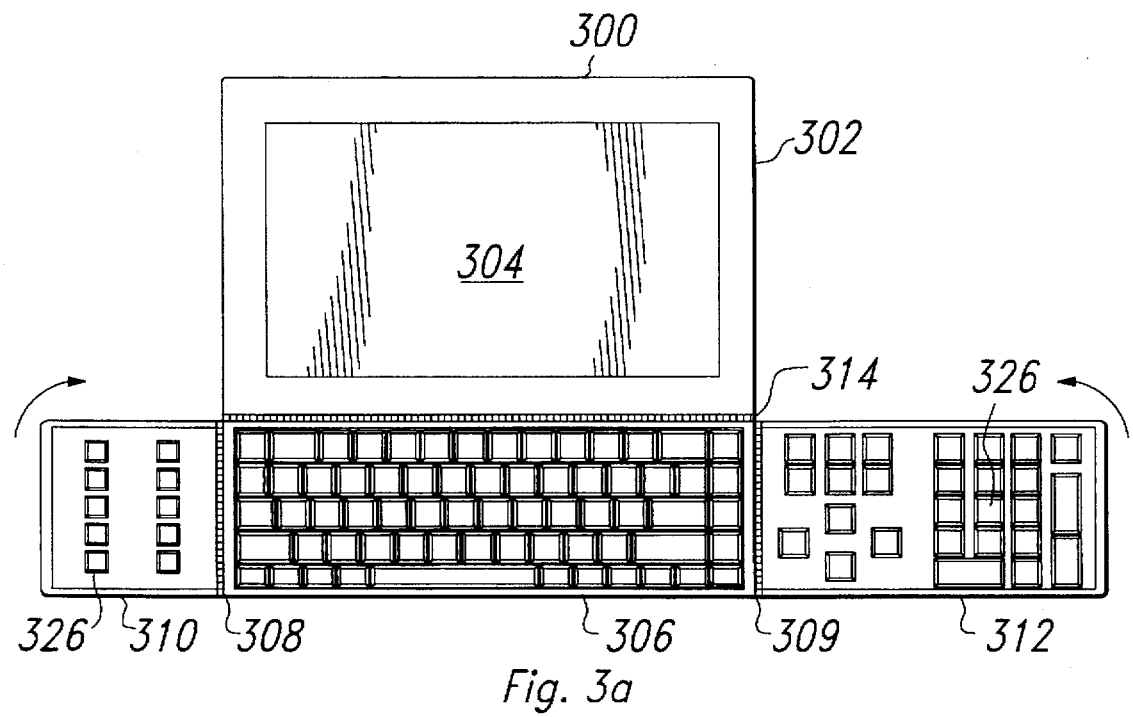
FIG. 3a Represents a plan view of the preferred embodiment of an embodiment of the present invention.
Figure 3B:
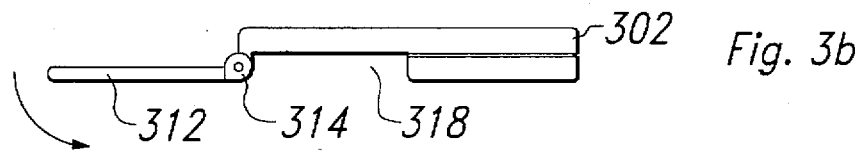

With reference to FIG. 3a a plan view of a third embodiment of the present invention also shown in connection with a portable pen computer 300. Computer 300 includes a housing 302 with a screen 304, and is uniquely provided with a triple folding keyboard 306 shown in the deployed position in FIG. 3a. In this embodiment, the keyboard comprises a fast hinge 308 connecting a left side keyboard section 310 with a center keyboard section 306. A second hinge 309 connects a right side keyboard section 312 to the center keyboard section 306. The keyboard may contain function keys 326 in one or both of the keyboard sections as indicated in FIG. 3b. The sections of the keyboard are preferably electrically connected with a flexible connection through the hinge 308 to the center section 306. The three keyboard sections 310, 312, 306 may incorporate individual circuit boards for interconnecting the keys, or they may use a single flexible circuit board with the interconnections between the sections through the hinges 308, 309.

A third hinge 314, shown in FIG. 3a and FIG. 3b, pivotally connects the three hinged keyboard sections to the housing 302. In the illustrated preferred embodiment, the second hinge 314 is integrally formed with the housing 302 and has a lower surface in a plane with the lower surface of the housing in such a way as to insure the keyboard and housing will lie securely on a flat surface allowing the user to type comfortably with the keyboard in a deployed position. The third hinge 314 also preferably incorporates electrical connections from the keys to the main processing board of the computer to transmit signals corresponding to the pressing of keys by the user.

Figure 3C:
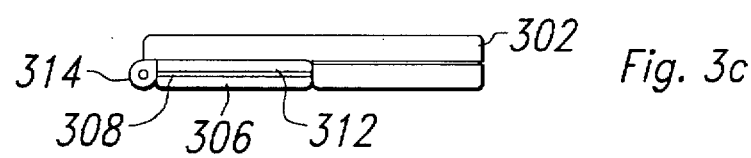

FIG. 3b shows a side view of the preferred embodiment of FIG. 3a with the keyboard 312 in the deployed position, while FIG. 3c shows a side view of the preferred embodiment of FIG. 3a with the keyboards 306, 310, 312 in the stowed position. The keyboard is stowed by first folding the keyboard about hinges 308, 309, with the direction shown by the arrows in FIG. 3a and then rotating the folded keyboard into the cavity 318 in the underside of the housing 302, shown by the arrow in FIG. 3b.

Figure 3D:
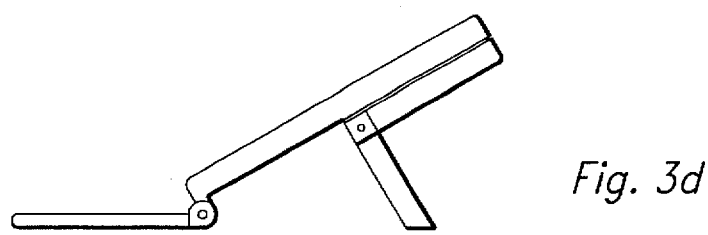
FIG. 3d Represents a side view of the preferred embodiment of FIG. 3a in an optional configuration, FIG. 4a Represents a plain view of a preferred embodiment.

FIG. 3d represents a side view of the embodiment represented in FIG. 3a with the additional capability of a hinged housing or legs from the housing to support the display in an upright position for a better viewing angle for the user when the computer is placed on a flat surface. This feature of this embodiment further bridges the gap from a PDA to a subnotebook of the prior art and emphasizes that the terms used for classification such as PDA, notebook and subnotebook become arbitrary or confusing at best. Therefore it should be noted that these terms have only been used for example.

Figure 4A:
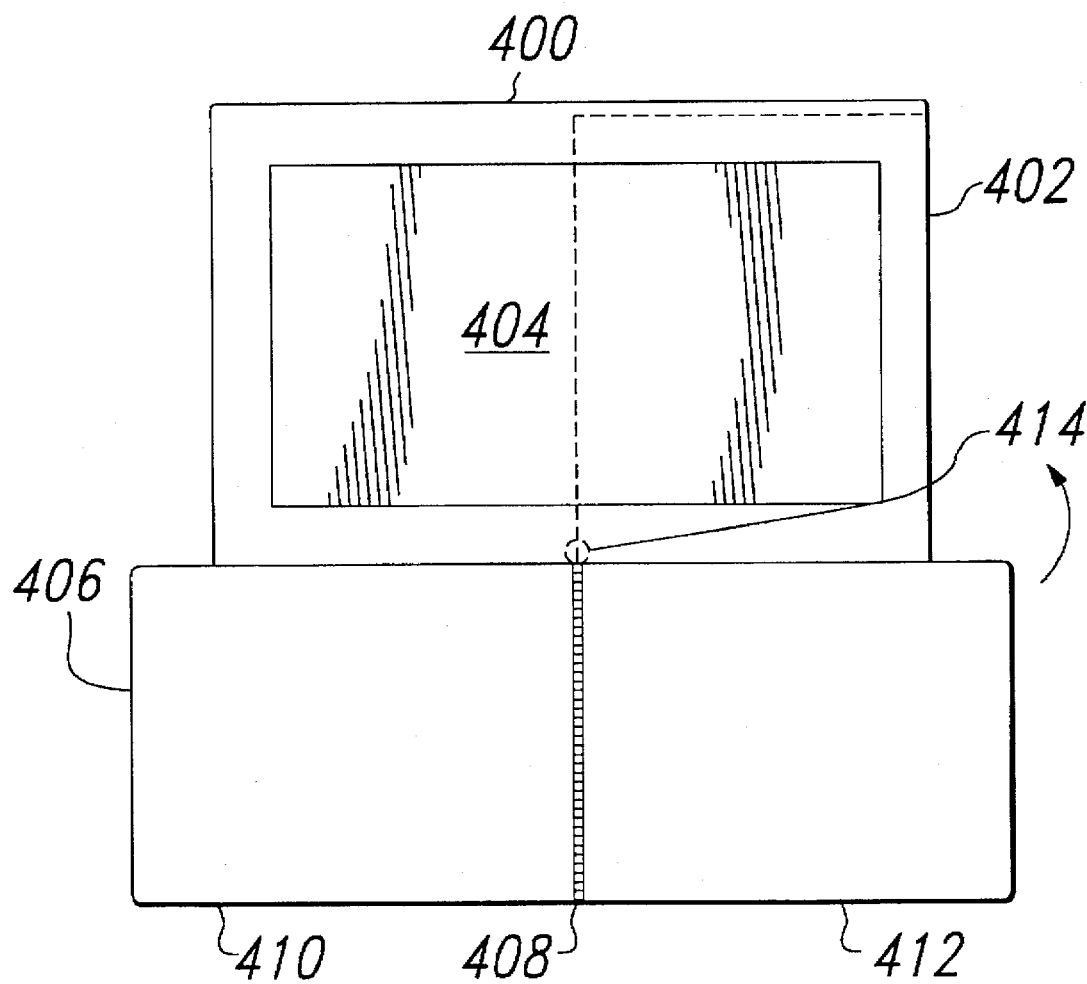

With reference to FIG. 4a a plan view of a fourth embodiment of the present invention also shown in connection with a portable pen computer 400. Computer 400 includes a housing 402 with a screen 404, and is uniquely provided with a combination folding and rotating keyboard 406 shown in the deployed position in FIG. 4a. In this embodiment, the keyboard comprises a first hinge 408 connecting a left side keyboard section 410 with a right side keyboard section 412. The keyboard may contain function keys 426 in one or both of the keyboard sections. The keyboard may have the keys split with the left and right hand keys, preferably of the QUERTY keyboard, split between left keyboard 410 and right keyboard 412, or the standard alpha keys could all be located on one keyboard and the functional keys on the other.

A second hinge or rotation mechanism 414, shown in FIG. 4a, pivotally connects the two hinged keyboard sections to the housing 402. In the illustrated preferred embodiment, the second hinge 414 is formed in such a way as to insure the keyboard and housing will lie securely on a flat surface allowing the user to type comfortably with the keyboard in a deployed position. Also, the housing 404 preferably has a leg portion 418 to provide stability to the housing in the deployed position.

Figure 4B:
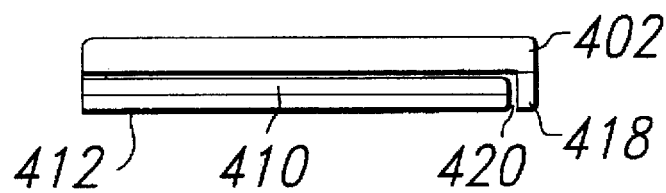

FIG. 4b shows a side view of the preferred embodiment of FIG. 4a with the keyboard 406 in the stowed position. The keyboard is stowed by first folding the keyboard about hinge 408 from left to right, left keyboard 410 over right keyboard 412, and then rotating the folded keyboards into the cavity 420 in the underside of the housing 402, shown by the arrow in FIG. 4b.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. For example, the housing of the embodiments containing the display may also incorporate a protective covering or other means to deploy the screen from a protective stored position. Also, the embodiment shown in FIG. 4 could be modified to include the double folding keyboard shown in FIG. 3a. Moreover, locking means could be added to any of the embodiments to secure the keyboard in the stowed position. In addition, the housing shown in the various figures could simply be a desk, counter surface, an electrical appliance enclosures or other surface such as a automobile dashboard where a compact, storable keyboard is desired.

What is claimed is:

1. A portable computing device comprising:
   a. a unitary housing having a top and a bottom surface;
   b. a display associated with the top surface of the housing;
   c. a keyboard having a plurality of keys and having at least one folding hinge for folding a first portion of the keyboard over a second portion of the keyboard; and
   d. a mounting hinge connecting the keyboard to the housing for deploying the keyboard from a storage position, where said storage position is substantially located in a bottom portion of the housing through an opening in the bottom surface, the keyboard in a deployed position being able to be unfolded, and where the keyboard keys are protected in the storage position.

2. The portable computer of claim 1, wherein said keyboard folding hinge is a lateral hinge dividing the keyboard into an upper keyboard section corresponding to said second keyboard portion and a lower keyboard section corresponding to said first keyboard section such that the keyboard uses a double hinge action to stow the keyboard.

3. The portable computer of claim 2, wherein said keyboard has three rows of keys above and three rows of keys below the hinge.

4. The portable computer of claim 2, wherein said portable computer is a personal digital assistant having a pen for user data input.

5. The portable computer of claim 1, wherein said keyboard folding hinge is a vertical hinge dividing the keyboard into an left keyboard section corresponding to said second keyboard portion and a right keyboard section corresponding to said first keyboard portion such that the keyboard uses a double hinge action to stow the keyboard.

6. The portable computer of claim 5, wherein said keyboard is divided such that the keyboard keys associated with touch typing on a QUERTY keyboard are located on the respective left and right section corresponding to the hand of the user used for typing the key.

7. The portable computer of claim 6, wherein said keyboard is divided such that the left and right sections corresponding to the hand of the user used for typing the key have a housing having a straight edge running from the top to the bottom of the keyboard.

8. The portable computer of claim 5, wherein said portable computer is a personal digital assistant having a pen for user data input.

9. The portable computer of claim 1, wherein said keyboard has two vertical hinges dividing the keyboard into a center keyboard section a left keyboard section and a right keyboard section.

10. The portable computer of claim 9, wherein said portable computer is a personal digital assistant having a pen for user data input.

11. A portable computing device comprising:
   a. a unitary housing having a top and a bottom surface;
   b. a display associated with the top surface of the housing;
   c. a keyboard having a plurality of keys and having at least one folding hinge for folding a first portion of the keyboard over a second portion of the keyboard; and
   d. a pivot connecting the keyboard to the housing at a single pivot point for pivotally deploying the keyboard from a storage position located in a lower portion of said housing, such that the keyboard is below said top surface and wherein a bottom of said keyboard is adjacent the bottom surface of the housing, the keyboard in a deployed position being able to be unfolded, and where the keyboard keys are protected in the storage position.

12. The portable computer of claim 11, wherein said portable computer is a personal digital assistant having a pen for user data input.

13. A keyboard for a computing device comprising:
   a. a mounting surface having a front face perpendicular to the mounting surface;
   b. a keyboard having a plurality of keys and having at least one folding hinge for folding a first portion of the keyboard over a second portion of the keyboard; and
   c. a mounting hinge connecting the second portion of the keyboard to the mounting surface at the front face for deploying the keyboard from a storage position, where said storage position is substantially located below the mounting surface, and wherein the keyboard is moved to the deployed position by rotating first about the mounting hinge and then about the folding hinge, and where the keyboard keys are protected in the storage position.

14. The keyboard of claim 13, wherein said keyboard folding hinge is a lateral hinge dividing the keyboard into an upper keyboard section corresponding to said second keyboard portion and a lower keyboard section corresponding to said first keyboard section such that the keyboard uses a double hinge action to stow the keyboard.

15. The keyboard of claim 14, wherein said keyboard has three rows of keys above and three rows of keys below the hinge.

16. The keyboard of claim 13, wherein said keyboard folding hinge is a vertical hinge dividing the keyboard into an left keyboard section corresponding to said second keyboard portion and a right keyboard section corresponding to said first keyboard portion such that the keyboard uses a double hinge action to stow the keyboard.

17. The portable computer of claim 16, wherein said keyboard is divided such that the keyboard keys associated with touch typing on a QUERTY keyboard are located on the respective left and right section corresponding to the hand of the user used for typing the key.

18. The portable computer of claim 17, wherein said keyboard is divided such that the left and right sections corresponding to the hand of the user used for typing the key have a housing having a straight edge running from the top to the bottom of the keyboard.

19. The portable computer of claim 13, wherein said keyboard has two vertical hinges dividing the keyboard into a center keyboard section a left keyboard section and a right keyboard section.

* * * * *